(12) United States Patent
Lee et al.

(10) Patent No.: US 10,166,587 B2
(45) Date of Patent: Jan. 1, 2019

(54) SMART ACTIVE CONTROL ROLLER HEMMING DEVICE AND SYSTEM

(71) Applicants: Kia Motors Corporation, Seoul (KR); Hyundai Wia Corporation, Changwon, Gyungsangnam-do (KR)

(72) Inventors: Seung Ho Lee, Incheon (KR); Yeonsoo Kim, Gyeonggi-do (KR); Won Sub Tae, Gyeonggi-do (KR); Taek Yeong Im, Gyeonggi-do (KR); Gwang Yeol Lee, Ulsan (KR)

(73) Assignees: KIA MOTORS CORPORATION, Seoul (KR); HYUNDAI WIA CORPORATION, Changwon, Gyungsangnam-do (KR)

( * ) Notice: Subject to any disclaimer, the term of this patent is extended or adjusted under 35 U.S.C. 154(b) by 69 days.

(21) Appl. No.: 15/390,010

(22) Filed: Dec. 23, 2016

(65) Prior Publication Data

US 2018/0050377 A1   Feb. 22, 2018

(30) Foreign Application Priority Data

Aug. 16, 2016   (KR) .................. 10-2016-0103833

(51) Int. Cl.
    *B21D 19/04*    (2006.01)
    *B21D 39/02*    (2006.01)
    *B25J 9/16*     (2006.01)

(52) U.S. Cl.
    CPC ......... *B21D 19/043* (2013.01); *B21D 39/023* (2013.01); *B25J 9/1633* (2013.01)

(58) Field of Classification Search
    CPC ..... B21D 19/043; B21D 39/023; B25J 9/1633
    See application file for complete search history.

(56) References Cited

U.S. PATENT DOCUMENTS

| 6,694,793 | B1 * | 2/2004 | Persson ............... | B21D 39/021 |
| | | | | 29/243.58 |
| 2010/0242561 | A1 * | 9/2010 | Reith .................. | B21D 19/043 |
| | | | | 72/252.5 |
| 2010/0313621 | A1 * | 12/2010 | Kumagai ............. | B21D 39/021 |
| | | | | 72/220 |

FOREIGN PATENT DOCUMENTS

| JP | 2010-284692 A | | 12/2010 | |
| KR | 20030097101 A | * | 12/2003 | ........... B21D 39/021 |
| KR | 10-2008-0032735 A | | 4/2008 | |
| KR | 10-1309518 B1 | | 9/2013 | |

OTHER PUBLICATIONS

Machine translation of KR20030097101A, Hwang, translated on Apr. 30, 2018, pp. 1-9.*

* cited by examiner

*Primary Examiner* — Teresa M Ekiert
(74) *Attorney, Agent, or Firm* — Mintz Levin Cohn Ferris Glovsky and Popeo, P.C.; Peter F. Corless

(57) ABSTRACT

A smart active control hemming device is provided. The device includes a robot arm and a hemming roller unit that is disposed at a front end portion of the robot arm. The hemming roller unit includes a plurality of hemming rollers, a control motor that is driven with an electric motor to adjust a hemming pressure or position of at least one of the hemming rollers, and a pressure detection sensor that detects a hemming pressure of the hemming roller in which a hemming pressure is adjusted by the control motor.

17 Claims, 4 Drawing Sheets

SMART ACTIVE CONTROL ROLLER HEMMING DEVICE AND SYSTEM

CROSS-REFERENCE TO RELATED APPLICATION

This application claims priority to and the benefit of Korean Patent Application No. 10-2016-0103833 filed in the Korean Intellectual Property Office on Aug. 16, 2016, the entire contents of which are incorporated herein by reference.

BACKGROUND (a) Field of the Invention

The present invention relates to a smart active control hemming device and system that more accurately and rapidly perform hemming by correcting a hemming pressure that is applied to a hemming roller and a position of the hemming roller using a control motor.

(b) Description of the Related Art

A vehicle body is manufactured at a first step of a vehicle production process, and a product panel is manufactured using several types of press devices, the product panel is moved to a vehicle body factory and each portion of the product panel is assembled. In general, a vehicle door is formed with an inner panel and an outer panel, and the panels are bonded through a hemming process. A hemming process is a type of coupling process that folds and stacks an end portion of a panel and is a coupling process of a form in which an end portion of an outer panel of a door folds to enclose an end portion of an inner panel. When performing a hemming process, by installing an upper mold and a lower mold that are manufactured based on a shape of each door in a hemming press and by setting a panel between the molds, a hemming process is performed.

A conventional hemming device includes a plurality of hemming rollers for bending a panel in multi-steps and a main cam for bending and bonding the panel. To remove assembly interference in a T-GATE portion or a hood of a vehicle body, an outer panel is bent by 105° or more, and when a bending angle is about 105° or more, a hemming work is sequentially performed. An existing hemming driver includes an air cylinder. However, a pressure that presses a hemming cam is not constant, and an error may occur between a pressure value required by a user and an actual pressure value and thus a hemming angle and quality are not constant.

The above information disclosed in this section is merely for enhancement of understanding of the background of the invention and therefore it may contain information that does not form the prior art that is already known in this country to a person of ordinary skill in the art.

SUMMARY

The present invention provides a smart active control hemming device and system having advantages of constantly maintaining a hemming angle and quality, reducing a hemming time, improving productivity, and preventing a hemming mold (hemming die) from being damaged by correcting an error between a target hemming pressure required by a user and an actual hemming pressure.

An exemplary embodiment of the present invention provides a smart active control hemming device including: a robot arm; and a hemming roller unit disposed at a front end portion of the robot arm, wherein the hemming roller unit may include: a plurality of hemming rollers; a control motor driven with an electric motor to adjust a hemming pressure or position of at least one of the hemming rollers; and a pressure detection sensor configured to detect a hemming pressure of the hemming roller in which a hemming pressure is adjusted by the control motor.

The smart active control hemming device may further include: a signal amplification device configured to amplify a pressure signal detected by the pressure detection sensor; a hemming pressure input unit configured to receive an input of a target value of a hemming pressure formed by the hemming rollers; and a hemming pressure active controller configured to receive an actual value of a hemming pressure detected by the pressure detection sensor through the signal amplification device and compare the actual value with the target value to adjust a hemming pressure using the control motor.

The hemming rollers may include: a first hemming roller that primarily bends a panel; a second hemming roller that secondarily bends the panel; and a third hemming roller that completes hemming by tertiarily bending the panel. The control motor may include: a first control motor configured to adjust a hemming pressure of the first hemming roller; and a second control motor configured to adjust a hemming pressure of the second hemming roller and the third hemming roller. The pressure detection sensor may be disposed on a path that transfers a hemming pressure from the control motor to the hemming roller to detect a pressure in real time.

The first hemming roller may be disposed on a die and primarily bend an edge of a panel fixed by a pad by a first predetermined angle, the second hemming roller may secondarily bend an edge of the panel by a second predetermined angle, and the third hemming roller may complete a hemming work by tertiarily bending (e.g., bending in a tertiary way) an edge of the panel. The hemming pressure active controller may be configured to detect an actual hemming pressure using the pressure detection sensor, convert the detected actual hemming pressure to a digital signal, compare an input target hemming pressure and the actual hemming pressure using the hemming pressure input unit, and operate the control motor based on a difference value thereof to correct the difference value.

The hemming pressure active controller may further be configured to generate a failure signal when the difference value exceeds a predetermined value. The hemming pressure active controller may be configured to compensate an output voltage of the control motor based on the difference value to compensate an output torque. Additionally, the hemming pressure active controller may be configured to perform a hemming work by the hemming rollers when the difference value is less than a predetermined value. The smart active control hemming device may further include: a robot controller configured to operate the robot arm; and a robot driver configured to move the robot arm to a predetermined location at a three-dimensional space by a control signal of the robot controller to enable the hemming rollers to sequentially hem a panel.

Another exemplary embodiment of the present invention provides a smart active control hemming roller system that may include: a plurality of hemming rollers; a control motor driven with an electric motor to adjust a hemming pressure or position of at least one of the hemming rollers; and a pressure detection sensor configured to detect a hemming pressure of the hemming roller in which a hemming pressure is adjusted by the control motor.

The smart active control hemming roller system may further include: a signal amplification device configured to amplify a pressure signal detected by the pressure detection sensor; a hemming pressure input unit configured to receive an input of a target value of a hemming pressure formed by the hemming rollers; and a hemming pressure active controller configured to receive an actual value of a hemming pressure detected by the pressure detection sensor through the signal amplification device and compare the actual value with the target value to adjust a hemming pressure using the control motor. The pressure detection sensor may be disposed on a path that transfers a hemming pressure from the control motor to the hemming roller to detect a pressure in real time.

Yet another exemplary embodiment of the present invention provides a smart active control hemming roller method that may include: detecting, by a pressure detection sensor, an actual hemming pressure applied to hemming rollers; comparing an input target hemming pressure and the actual hemming pressure; calculating an error value between the actual hemming pressure and the target hemming pressure; compensating, when the error value is less than a predetermined value, an output torque of a control motor that adjusts a hemming pressure applied to hemming roller.

The smart active control hemming roller method may further include generating, when the error value exceeds a predetermined value, a failure signal. Additionally, the smart active control hemming roller method may include converting the actual hemming pressure to a digital signal. The target hemming pressure may be received via a hemming pressure input unit, and a pressure signal detected by the pressure detection sensor may be amplified by a signal amplification device. The hemming rollers may include a first hemming roller, a second hemming roller, and a third hemming roller, and the control motor may include a first control motor configured to adjust a hemming pressure of the first hemming roller and a second control motor configured to adjust a hemming pressure of the second and third hemming rollers. The pressure detection sensor may be disposed on a path that transfers a hemming pressure from the control motor to the hemming rollers to detect a pressure in real time.

According to the present invention, a hemming pressure and a position of a hemming roller may be more rapidly and accurately adjusted using a control motor using an electric motor, and an error range between a target value and an actual value may be reduced. Further, by realizing a stable hemming pressure and position, a quality of a hemmed panel may be improved, and a hemming quality of a bending portion may be improved. A hemming die (mold) may also be prevented from being damaged, and by reducing a hemming step, productivity may be improved, and a quality of an entire panel may be improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
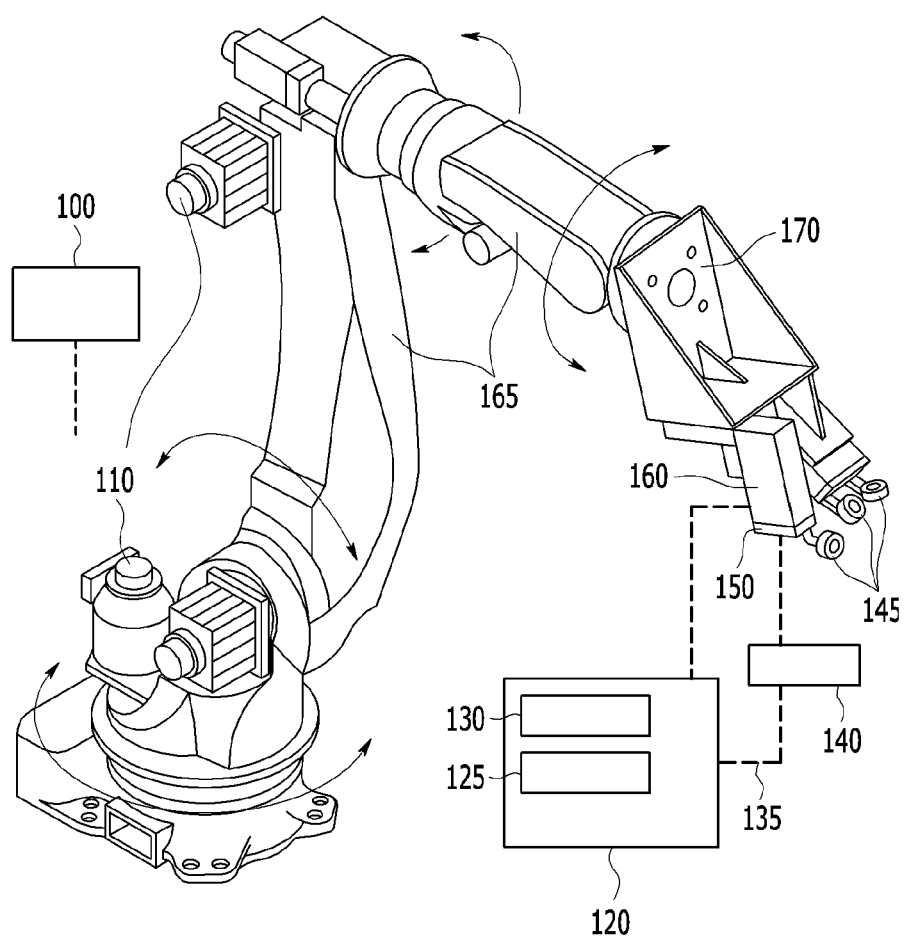
FIG. 1 is an entire schematic diagram of a smart active control hemming system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings.

Further, in the drawings, a size and thickness of each element are randomly represented for better understanding and ease of description, and the present invention is not limited thereto and the thickness of several portions and areas are exaggerated for clarity. The drawings and description are to be regarded as illustrative in nature and not restrictive. Like reference numerals designate like elements throughout the specification. In the following description, terms such as a first and a second used in names of constituent elements are used for distinguishing constituent elements having the same name and do not limit order thereof.

FIG. 1 is an entire schematic diagram of a smart active control hemming system according to an exemplary embodiment of the present invention. Referring to FIG. 1, the hemming system may include a robot controller 100, a robot driver 110, a robot arm 165, a bracket 170, a control motor 160, a pressure detection sensor 150, hemming rollers 145, a cable 135, a signal amplification device 140, and a hemming controller 120, and the hemming controller 120 may include a hemming pressure input unit 130 and a hemming pressure active controller 125. The robot controller 100 or the hemming controller 120 may be implemented with at least one microprocessor operating by a predetermined program, and the predetermined program may include a series of instructions for performing a method according to an exemplary embodiment of the present invention to be described later.

Particularly, the bracket 170 may be fixed to the front end of the robot arm 165, and the hemming rollers 145 may be disposed at a lower portion of the bracket 170. Three hemming rollers 145 may specifically be disposed at a predetermined gap from each other in a predetermined direction. The control motor 160 may be disposed between the bracket 170 and the hemming rollers 145 and may be configured to adjust a hemming pressure applied to the hemming rollers 145 using electrical energy.

Further, the pressure detection sensors 150 may each be disposed between the control motor 160 and the hemming rollers 145, the pressure detection sensor 150 may be configured to detect a hemming pressure applied to the hemming rollers 145 and transfer the hemming pressure to the signal amplification device 140. The signal amplification device 140 may be configured to transmit the hemming pressure to the hemming controller 120 via a cable (wire). The hemming controller 120 may be configured to convert an analog signal from the signal amplification device 140 to a digital pressure signal and compare the digital pressure signal with a digital pressure signal input through the hemming pressure input unit 130.

In other words, a digital pressure signal input through the hemming pressure input unit 130 corresponds to a target hemming pressure, and a digital pressure signal converted from an analog signal input through the signal amplification device 140 corresponds to an actual hemming pressure. The hemming pressure active controller 125 may be configured to compare a target hemming pressure and an actual hemming pressure, and when a difference value thereof exceeds a predetermined value, the hemming pressure active controller 125 maybe configured to correct power input to the control motor 160 to correct each of hemming pressures applied to the hemming rollers 145.

Figure 2:
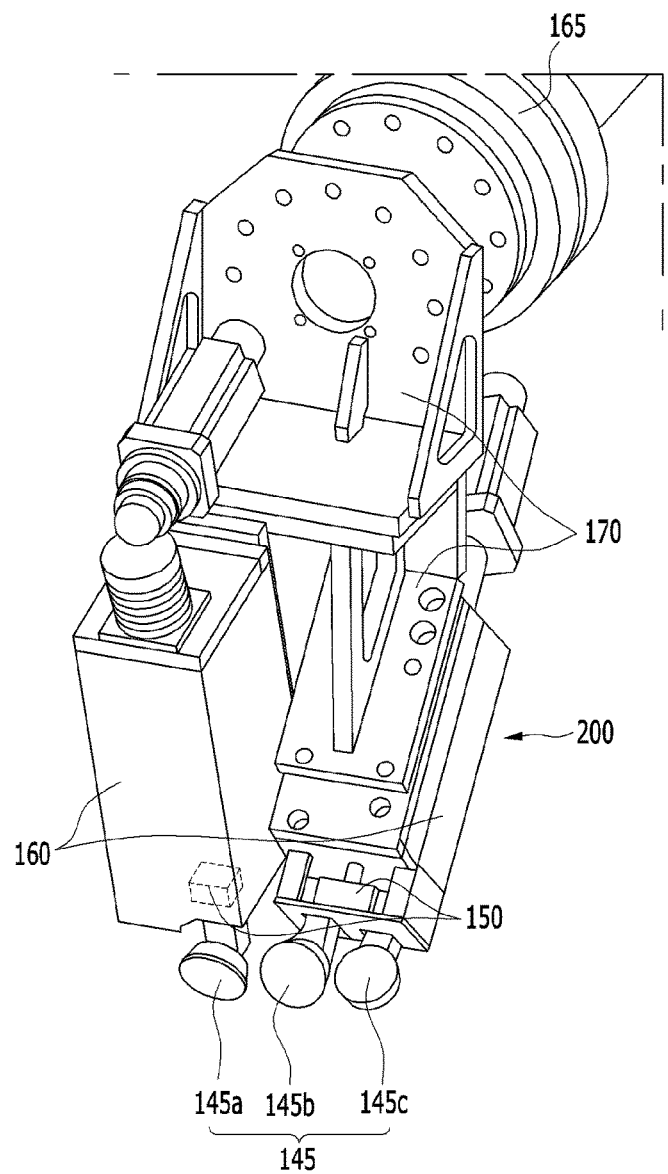
FIG. 2 is a partial perspective view of a smart active control hemming system according to an exemplary embodiment of the present invention.

FIG. 2 is a partial perspective view of a smart active control hemming system according to an exemplary embodiment of the present invention. Referring to FIG. 2, a hemming roller unit 200 may include a bracket 170, a control motor 160, a pressure detection sensor 150, and a hemming roller 145, and the hemming roller 145 may include a first hemming roller 145a, a second hemming roller 145b, and a third hemming roller 145c. The control motor 160 may include a first control motor 160 configured to adjust a hemming pressure applied to the first hemming roller 145a and a second control motor 160 configured to adjust a hemming pressure applied to the first and second hemming rollers 145a and 145b.

In another exemplary embodiment of the present invention, the control motor 160 may be disposed to correspond to each of the first hemming roller 145a, the second hemming roller 145b, and the third hemming roller 145c, one control motor 160 may be disposed at the first hemming roller 145a and the second hemming roller 145b, and one control motor 160 may be disposed at the third hemming roller 145c. The bracket 170 may be fixed to the front end of the robot arm 165, the control motor 160 may be fixed to the bracket 170, and at the front end of the control motor 160, the first hemming roller 145a, the second hemming roller 145b, and the third hemming roller 145c may be arranged in a predetermined direction at a predetermined gap from each other.

Further, the pressure detection sensor 150 may be disposed on a path in which a hemming pressure is transferred between the control motor 160 and the hemming rollers 145. The pressure detection sensor 150 may be disposed to correspond to each of the first, second, and third hemming rollers 145a, 145b, and 145c and may be configured to detect a hemming pressure of a hemming work in which the first hemming roller 145a performs, detect a hemming pressure of a hemming work in which the second hemming roller 145b performs, and detect a hemming pressure of a hemming work in which the third hemming roller 145c performs.

Figure 3:
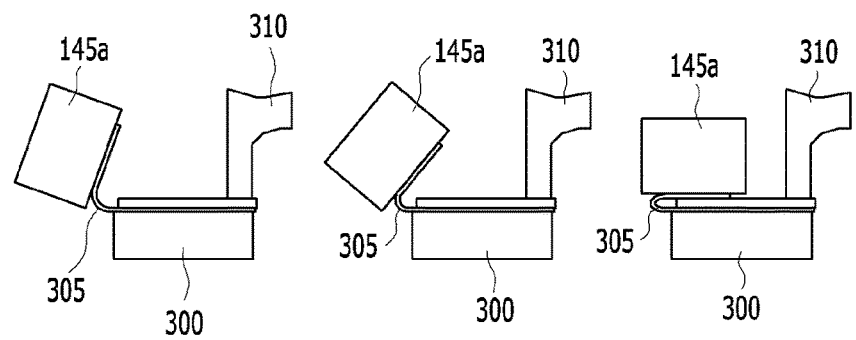
FIG. 3 is a diagram illustrating a hemming process by a smart active control hemming system according to an exemplary embodiment of the present invention.

FIG. 3 is a diagram illustrating a hemming process by a smart active control hemming system according to an exemplary embodiment of the present invention. Referring to FIG. 3, the hemming system may include a hemming die 300, a pad 310, a panel 305, a first hemming roller 145a, a second hemming roller 145b, and a third hemming roller 145c. The panel 305 may be disposed on the hemming die 300, and the pad 310 fixes the panel 305 on the hemming die 300 (e.g., holds the panel 305 onto the hemming die 300). Further, the first hemming roller 145a may bend the panel 305 from about 105° to 70° with a predetermined hemming pressure. Thereafter, the second hemming roller 145b may bend the panel 305 from about 70° to 40° with a predetermined hemming pressure. The third hemming roller 145c completes a hemming work by bending the panel 305 from about 40° to 0° with a predetermined hemming pressure.

Figure 4:
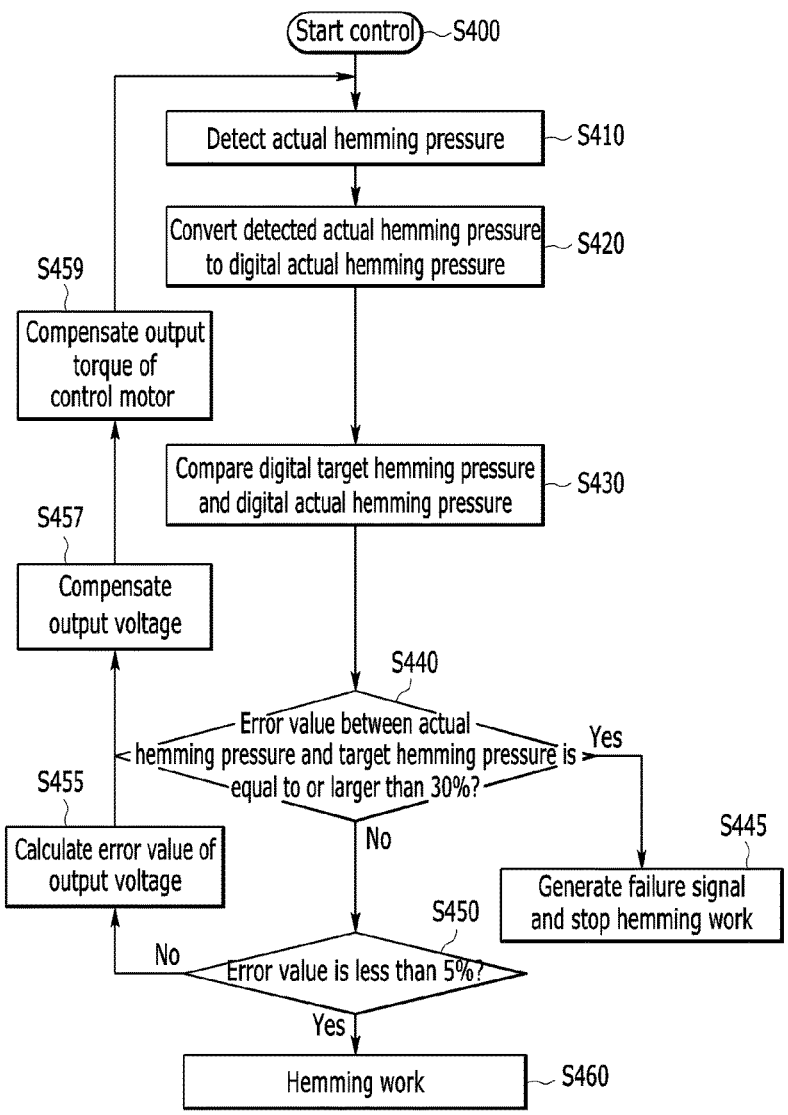
FIG. 4 is a flowchart illustrating a method in which a smart active control hemming system performs according to an exemplary embodiment of the present invention.

FIG. 4 is a flowchart illustrating a method in which a smart active control hemming system performs according to an exemplary embodiment of the present invention. A control is started (S400), the pressure detection sensor 150 may be configured to detect an actual hemming pressure (S410), and the hemming controller 120 may be configured to receive the actual hemming pressure through the signal amplification device 140 and convert the actual hemming pressure to a digital actual hemming pressure (S420).

The hemming pressure input unit 130 may then be configured to receive an input of a predetermined digital target hemming pressure from the outside, and the hemming controller 120 may be configured to compare a digital target hemming pressure input through the hemming pressure input unit 130 and a digital actual hemming pressure (S430). The hemming controller 120 may further be configured to determine whether an error value between an actual hemming pressure and a target hemming pressure is equal to or greater than about 30% (S440), and when an error value between an actual hemming pressure and a target hemming pressure is equal to or greater than about 30%, the hemming controller 120 may be configured to generate a failure signal and stop a hemming work (S445).

When an error value between an actual hemming pressure and a target hemming pressure is less than about 30% at step S440, the hemming controller 120 may be configured to determine whether the error value is less than about 5% (S450). When the error value is less than about 5%, the hemming controller 120 normally performs a hemming work (S460). When the error value is equal to or greater than about 5% and less than about 30% at step S450, the hemming controller 120 may be configured to calculate an error value of an output voltage applied to the control motor 160 (S455) and compensate an output voltage based on an error value of an output voltage (S457). Therefore, an output torque output from the control motor 160 may be compensated (S459), and step S410 is again performed. In an exemplary embodiment of the present invention, a smart roller hemming device may be configured to move hemming rollers on a robot arm along 7 shafts or 8 shafts using the electric position control motor 160 and thus a controller may adjust a hemming pressure and a position value of the hemming roller.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

100: robot controller
110: robot driver
120: hemming controller
125: hemming pressure active controller
130: hemming pressure input unit
135: cable
140: signal amplification device
145*a*: first hemming roller
145*b*: second hemming roller
145*c*: third hemming roller
145: hemming roller
150: pressure detection sensor
160: control motor
165: robot arm
170: bracket
200: hemming roller unit
300: hemming die
305: panel
310: pad

What is claimed is:

1. A smart active control hemming device, comprising:
a robot arm; and
a hemming roller unit disposed at a front end portion of the robot arm,
wherein the hemming roller unit comprises:
a plurality of hemming rollers;
a control motor driven with an electric motor to adjust a hemming pressure or position of at least one of the hemming rollers; and
a pressure detection sensor configured to detect a hemming pressure of the hemming roller in which a hemming pressure is adjusted by the control motor, and
wherein the smart active control hemming device further comprises:

a signal amplification device configured to amplify a pressure signal detected by the pressure detection sensor;
a hemming pressure input unit configured to receive an input of a target value of a hemming pressure formed by the hemming rollers; and
a hemming pressure active controller configured to receive an actual value of a hemming pressure detected by the pressure detection sensor through the signal amplification device and compare the actual value with the target value to adjust a hemming pressure using the control motor.

2. The smart active control hemming device of claim 1, wherein the hemming rollers include:
a first hemming roller that primarily bends a panel;
a second hemming roller that secondarily bends the panel; and
a third hemming roller that completes hemming by tertiarily bending the panel.

3. The smart active control hemming device of claim 2, wherein the control motor includes:
a first control motor configured to adjust a hemming pressure of the first hemming roller; and
a second control motor configured to adjust a hemming pressure of the second hemming roller and the third hemming roller.

4. The smart active control hemming device of claim 3, wherein the pressure detection sensor is disposed on a path that transfers a hemming pressure from the control motor to the hemming roller to detect a pressure in real time.

5. The smart active control hemming device of claim 3, wherein the first hemming roller is disposed on a die and primarily bends an edge of a panel fixed by a pad by a first predetermined angle, the second hemming roller secondarily bends an edge of the panel by a second predetermined angle, and the third hemming roller completes a hemming work by tertiarily bending an edge of the panel.

6. The smart active control hemming device of claim 3, wherein the hemming pressure active controller is configured to detect an actual hemming pressure using the pressure detection sensor, convert the detected actual hemming pressure to a digital signal, compare an input target hemming pressure and the actual hemming pressure using the hemming pressure input unit, and adjust the control motor according to a difference value thereof to correct the difference value.

7. The smart active control hemming device of claim 6, wherein the hemming pressure active controller is configured to generate a failure signal when the difference value exceeds a predetermined numerical value.

8. The smart active control hemming device of claim 6, wherein the hemming pressure active controller is configured to compensate an output voltage of the control motor based on the difference value to compensate an output torque.

9. The smart active control hemming device of claim 6, wherein the hemming pressure active controller is configured to perform a hemming work by the hemming rollers when the difference value is within a predetermined numerical value.

10. The smart active control hemming device of claim 1, further comprising:
a robot controller configured to operate the robot arm; and
a robot driver configured to move the robot arm to a predetermined location at a three-dimensional space by a control signal of the robot controller to enable the hemming rollers to sequentially hem a panel.

11. A smart active control hemming roller system, comprising:
a plurality of hemming rollers;
a control motor driven with an electric motor to adjust a hemming pressure or position of at least one of the hemming rollers;
a pressure detection sensor configured to detect a hemming pressure of the hemming roller in which a hemming pressure is adjusted by the control motor;
a signal amplification device configured to amplify a pressure signal detected by the pressure detection sensor;
a hemming pressure input unit configured to receive an input of a target value of a hemming pressure in which the hemming rollers form; and
a hemming pressure active controller configured to receive an actual value of a hemming pressure detected by the pressure detection sensor through the signal amplification device and compare the actual value with the target value to adjust a hemming pressure using the control motor.

12. The smart active control hemming roller system of claim 11, wherein the pressure detection sensor is disposed on a path that transfers a hemming pressure from the control motor to the hemming roller to detect a pressure in real time.

13. A smart active control hemming roller method, comprising:
detecting, by a pressure detection sensor, an actual hemming pressure applied to hemming rollers;
comparing, by a hemming pressure active controller, an input target hemming pressure and the actual hemming pressure;
calculating, by the hemming pressure active controller, an error value between the actual hemming pressure and the target hemming pressure; and
controlling, by the hemming pressure active controller, operation of a control motor that adjusts a hemming pressure applied to hemming rollers such that an output torque of the control motor is compensated based on the calculated error value when the calculated error value is less than a predetermined value,
wherein the target hemming pressure is received through a hemming pressure input unit, and a pressure signal detected by the pressure detection sensor is amplified by a signal amplification device.

14. The smart active control hemming roller method of claim 13, further comprising:
generating, by the controller, a failure signal when the error value exceeds a predetermined value.

15. The smart active control hemming roller method of claim 13, further comprising:
converting, by the controller, the actual hemming pressure to a digital signal.

16. The smart active control hemming roller method of claim 15, wherein the hemming rollers include a first hemming roller, a second hemming roller, and a third hemming roller, and the control motor includes a first control motor configured to adjust a hemming pressure of the first hemming roller and a second control motor configured to adjust a hemming pressure of the second and third hemming rollers.

17. The smart active control hemming roller method of claim 14, wherein the pressure detection sensor is disposed on a path that transfers a hemming pressure from the control motor to the hemming rollers to detect a pressure in real time.

* * * * *